Patented Dec. 15, 1953

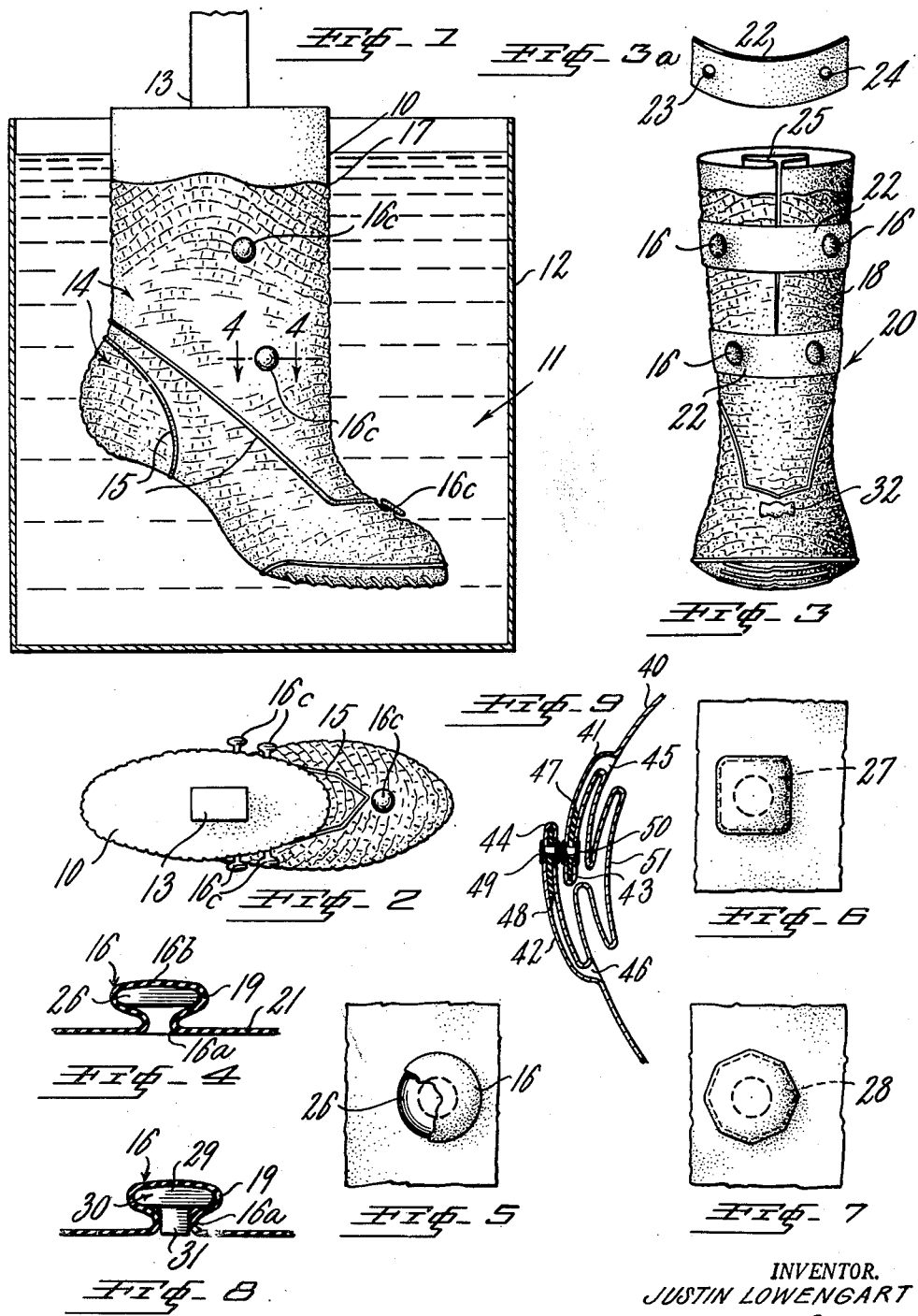

2,662,308

UNITED STATES PATENT OFFICE 2,662,308

PLASTIC, RUBBER OR LIKE ARTICLE WITH INTEGRAL FASTENING MEANS

Justin Loewengart, New York, N. Y.

Application April 10, 1952, Serial No. 281,614

4 Claims. (Cl. 36—7.3)

The present invention relates to articles of various descriptions made from plastic and preferably from rubber material by molding or dipping processes.

It was heretofore the practice to vulcanize projecting or inflatable parts to the body of an article regardless of whether the projecting part was either of hollow or solid cross-section. The present invention opens a new path for manufacturing especially thin-walled rubber articles with which any projections thereof, such as knobs, buttons, hooks, and the like, whether used for decorative or purely practical purposes, form unitary and integral parts of the body of the rubber article.

It is another object of the present invention to provide means facilitating improved manufacturing process steps which permit projecting and undercut parts of an article to be produced simultaneously with the remainder of the body of the article.

Yet another object of the present invention is to provide means affording variations in the shape of the projecting part or parts of a rubber or similar plastic article even after the completion of the manufacturing process steps.

Still another object of the invention is to provide means ensuring ready and speedy alterations in the shape of projections of the finished rubber article in accordance with the purpose to which the projection or projections are to be applied, such as fastening means, ornamentations and like decorative accessories.

Still another object of the present invention is to provide means rendering the possibility of locating projecting parts on a rubber or similar article wherever desired and without resorting to any complicated or intricate molds used for dipping and like shaping processes.

Still a further object of this invention is to provide means conducive to simplified production of uniformly shaped undercut projections which are integral with the body of the rubber and like article and which, if desired, may be reinforced at predetermined locations thereof by a layer deposit of latex and like substance which may be heavier than the wall thickness of the remainder of the rubber body, in particular, if the top part of any of the projections and/or its constricted or undercut part is to be expanded and subjected to stresses disproportionately to other parts of the rubber body.

With the above and other objects in view, the invention will be hereinafter more fully described and the combination and arrangements of parts will be shown in the accompanying drawing and pointed out in the claims which form part of the specification.

In the drawing:

Fig. 1 is a side elevational view of a mold embodying the invention, from which a rubber boot is to be produced by dipping process in a latex filled tank.

Fig. 2 is a top plan view of Fig. 1, the tank being omitted for the sake of clarity.

Fig. 3 is a front elevational view of a finished rubber boot provided with fastening means and decorative means embodying the invention and stripped off the mold and turned inside out.

Fig. 3a is a perspective view of a strip or connector.

Fig. 4 is an enlarged sectional view taken along line 4—4 of Fig. 1.

Fig. 5 is a fragmentary and enlarged front elevational view of a detail embodying the invention, shown with parts broken away.

Figs. 6 and 7 are respective views similar to Fig. 5, but somewhat modified.

Fig. 8 is an enlarged sectional view similar to that of Fig. 4, but somewhat modified.

Fig. 9 is a fragmentary top plan view in section of a finished rubber boot with modified fastening means.

Referring now more particularly to the drawing there is schematically shown and disclosed a well known dipping process, in which a mold 10 is employed made according to the invention. This mold 10 is lowered by means of a holder 13 into a bath 11 of latex solution which is contained in a tank 12.

The mold 10 may have a surface configuration 14 with shallow grooves or recesses 15 and fixed projections 16c (see Figs. 1 and 2), where projections 16 will be disposed in the finished rubber article 20 (see Fig. 3).

The article as shown is in the form of a boot although other rubber or plastic products may be manufactured in accordance with the invention, such as bathing caps, toys, girdles, garters, pressure relieving pads for shoes, surgical appliances and like articles which may be integrally provided with decorative and/or practical means such as fasteners. It is to be stressed that the invention is not to be considered limited in any sense although the same is herein described with respect to a preferred embodiment representing a rubber boot.

During the molding or dipping process herein referred to a uniform latex layer 17 of predetermined thickness is deposited on the surface of mold 10 which is then subsequently removed from the bath 11 and the finished article 20 is finally stripped off mold 10 in a well known manner.

Knob-shaped projections 16c forming integral parts of the mold 10 extend beyond the latter as can best be seen in Fig. 2.

After completion of the rubber article, tubular projections 16 are obtained, which are hollow in cross-section, and have, in this instance, a constricted or undercut stem-forming portion 16a and an enlarged head-forming or top portion 16b, which is closed at its end.

Wall 19 of the projection 16 is of the same flexibility and thickness as the wall 21 of the remainder of body 18 (Fig. 4), the projection and the latter being inherently flaccid and being obtained by stripping the body 18 off mold 10 while said body is being turned inside out.

Projection 16 is formed by core 16c as shown, and said core corresponds principally in shape to that of the finished projection when not deformed or subjected to change by special insert. Such core 16c is either fixed or removably connected to the outer surface of the mold 10, which may be made from light metal (aluminum, magnesium) or wood, porcelain or the like.

As can be seen from Fig. 3, upper and lower pairs of hollow projections 16 are arranged to extend sidewardly on finished boot 20. These projections are then interconnected by means of rubber or like strips 22 having slots or perforations 23, 24. The perforations 23, 24 may be spaced from each other any predetermined distance to facilitate engagement with the projections 16 serving as fastening means. This boot may be provided with a large enough instep so that part of the body of the boot may be placed in folds, as seen at 25, while the remainder of the boot is held snugly in position around the lower leg part of the wearer by means of the strips 22 and projections 16.

The projection 16 as seen in Fig. 4 is tubular in cross-section and may be reinforced by a flexible or solid insert 26, such as a button or similar discoidal element whereby the top or closed end surface 16b of the projection 16 immediately conforms to the shape of this insert or element 26, as can be visualized from Fig. 5. If the shape of the insert or button 26 is square, as seen Fig. 6, the shape of the projection head 27 will become square, or if the insert is octagonal as seen in Fig. 7, a projection shape 28 of octagonal configuration will be immediately obtained, wall 19 of said projection 16 being capable of stretching and readily conforming to the contour of the respective insert shape which may be at least in part larger than the inner width of said tubular projection.

Fig. 8 shows projection 16 in cross-section with expanded wall 19, the insert 30 being preferably non-stretchable, of mushroom shape and having the enlarged head 29 and a stem or extension 31 which latter reinforces the undercut or constricted portion 16a of the projection 16, as may be readily visualized. Wall 19 which is stretched about insert 30 and slightly therebelow, retains in position said insert while the latter remains in said tubular projection 16.

In Figs. 1 and 3 there is further indicated a projection 32 of the same original dimension as that of the other projections 16. Projection 32 also forms an integral part of the vamp of the boot and is designed to provide a decorative effect thereon. The shape of this decorative projection 32 has been changed to an elongated bow-shaped decoration by a suitable insert (not shown), as can be more clearly seen from Fig. 3.

It has been found that a preferably round latex rubber projection 16 of predetermined wall thickness and having a diameter of somewhat less than one-half inch may be readily stretched up to a diameter of approximately one inch and slightly more without endangering the durability of the wall of the finished and shaped decorative or fastening means thus obtained.

If desired, any projection or projections, which may each be of equal and uniform dimensions, may be separately reinforced by an additional layer or deposit of latex at the location where a particular stretch or stress will occur.

To this end, a heavier latex film may be created at the location of such projection. Thus a coagulant may be placed on the projecting corresponding core 16c of the mold in order to amass and deposit thereat a larger portion of latex.

Fig. 9 is a fragmentary view similar to that of Fig. 3 but shown from the top of the article and with modified fastening means. The body 40 of the article has two tubular shaped projections or extensions 41, 42 which are formed similar to the projections 16 hereinabove referred to. These tubular projections or extensions are closed at their respective ends 43, 44 and open into the interior of the body 40 at 45, 46. Inserts 47, 48 are lodged adjacent the respective ends 43, 44, which inserts are preferably made from felt, cloth, leather or sponge rubber in order to facilitate anchorage of snap fasteners 49—50 to close the article which, in this instance, has also an overlapping fold 51 similar to the fold 25 seen in Fig. 3.

Instead of snap fasteners 49—50 adjustable buckles may be employed or any other fastening means may be anchored on the extensions 41, 42 which are integral with the body 40, as may be readily realized.

It will be realized that if instead of projections 16 extending beyond the surface of the article, these projections are pushed outside in to project into the interior of the article, such "inner" projections may be used as a padding and may be filled out with any suitable material, either flexible, yieldable or solid, for taking up pressure or friction exerted on the inner wall of the article therewithout. The opening obtained on the outer surface of the body of the article (when pushing the projection outside in) can be utilized for any purpose whatsoever and may be closed by the insert itself or may be patched up with a decorative element, if desired.

It can thus be seen that there has been provided in accordance with the present invention an article made of stretchable plastic, rubber and like substance comprising a body having a surface outlining the contour of the article in finished form, and at least one hollow projection integral with and extending beyond said surface of said body, said projection including a top part and an undercut part positioned between said surface and said top part, the wall thickness of said body and of said projection being substantially equal throughout their extent.

From the foregoing description taken in connection with the accompanying drawing, the advantages of the process and article derived therefrom will be readily understood by those skilled in the art; and while there has been described a best embodiment of the invention, it is to be understood that such description is merely illus-

Having thus described the invention, what is claimed as new and desired to be secured by Letters Patent, is:

1. An article made of stretchable plastic, rubber and like material comprising a body having a base surface outlining the contour of the article in finished form, at least one tubular projection terminating in a closed end and integral with said body and positioned to extend beyond the surface of the latter and formed as an inherent part thereof, the wall thickness and flexibility of said body and of said projection being substantially equal, at least in the vicinity of the projection, and such that said projection is inherently flaccid, and a discoidal insert removably confined in said projection and lodged in the closed end thereof, said insert being dimensioned so as to be at least in part larger than the unstretched inside width of said tubular projection at said closed end, whereby said material of said projection is conformed to the contour of said insert and stretched about the latter and slightly below a part thereof, to thereby give form retaining property to said projection while said insert remains therein and to removably hold the insert therein.

2. An article made of stretchable plastic, rubber and like substance comprising a body having a base surface outlining the contour of the article in finished form, at least one tubular projection integral with said body and positioned to extend beyond the surface thereof and formed as an inherent part thereof, said projection including a top part and an undercut part, said undercut part being positioned between said surface of said body and said top part, the wall thickness and flexibility of said body and of said projection being substantially equal, at least in the vicinity of the projection, and such that said projection is inherently flaccid, and a removable insert lodged in only said top part of said tubular projection and dimensioned sufficient so as to stretch the top part of the projection around and slightly below said insert to hold said insert in place within said projection, said insert giving form retaining property to said top part while said insert remains in the same.

3. An article according to claim 2, wherein said insert is provided with an extension, said extension being positioned within said undercut part and extending therefrom toward said top part of said projection.

4. An article according to claim 2, wherein said insert within said projection is flexible and forms with the projection anchoring means for a fastener element.

JUSTIN LOEWENGART.

References Cited in the file of this patent

UNITED STATES PATENTS

| Number | Name | Date |
|---|---|---|
| 227,811 | Miller | May 18, 1880 |
| 697,812 | Crabb | Apr. 15, 1902 |
| 1,267,270 | Rheinlander | May 21, 1919 |
| 1,310,119 | Harper | July 15, 1919 |
| 1,589,158 | Hedison | June 15, 1926 |
| 1,867,881 | Crockett | July 19, 1932 |
| 1,993,212 | Edwardes | Mar. 5, 1935 |
| 2,070,839 | Place | Feb. 16, 1937 |
| 2,108,650 | Casey | Feb. 15, 1938 |
| 2,397,801 | Mitchell | Apr. 2, 1946 |
| 2,548,004 | Duefrene | Apr. 10, 1951 |
| 2,569,398 | Burd et al. | Sept. 25, 1951 |

FOREIGN PATENTS

| Number | Country | Date |
|---|---|---|
| 28,343 | Great Britain | Dec. 24, 1903 |
| 527,169 | Great Britain | Oct. 3, 1940 |